(12) United States Patent
Tsai et al.

(10) Patent No.: US 10,324,322 B2
(45) Date of Patent: Jun. 18, 2019

(54) ARRAY SUBSTRATE AND TOUCH DISPLAY DEVICE

(71) Applicant: Wuhan China Star Optoelectronics Technology Co., Ltd., Wuhan (CN)

(72) Inventors: Yucheng Tsai, Wuhan (CN); Yao Li Huang, Wuhan (CN); Chang Cao, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 14/897,697

(22) PCT Filed: Oct. 9, 2015

(86) PCT No.: PCT/CN2015/091562
§ 371 (c)(1),
(2) Date: Jan. 10, 2018

(87) PCT Pub. No.: WO2017/041341
PCT Pub. Date: Mar. 16, 2017

(65) Prior Publication Data
US 2018/0129090 A1 May 10, 2018

(30) Foreign Application Priority Data

Sep. 7, 2015 (CN) .......................... 2015 1 0566336

(51) Int. Cl.
*G06F 3/041* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC ........ *G02F 1/13338* (2013.01); *G02F 1/1333* (2013.01); *G02F 1/1343* (2013.01);
(Continued)

(58) Field of Classification Search
None
See application file for complete search history.

(56) References Cited

U.S. PATENT DOCUMENTS

| 2012/0038585 A1* | 2/2012 | Kim | G06F 3/0412 345/174 |
| 2015/0205428 A1* | 7/2015 | Wang | G06F 3/044 345/174 |

(Continued)

FOREIGN PATENT DOCUMENTS

| CN | 103761014 A | 4/2014 |
| CN | 104123039 A | 10/2014 |

(Continued)

OTHER PUBLICATIONS

Notification of Transmittal of the International Search Report and the Written Opinion of the International Searching Authority (Forms PCT/ISA/210, PCT/ISA/220, and PCT/ISA/237) dated May 27, 2016, by the State Intellectual Property Office of People's Republic of China in corresponding International Application No. PCT/CN2015/091562. (12 pages).

(Continued)

*Primary Examiner* — Dorothy Harris

(57) ABSTRACT

Disclosed is an array substrate and touch display device which belongs to the technical filed of display and is able to solve the technical problem that in the existing technologies, the process of manufacturing an array substrate is too complex. The array substrate includes a drive scan line, a data line, a first common electrode, a second common electrode, a touch scan line, a common transistor, and a touch transistor. The first common electrode and the second common electrode are arranged in a spaced-apart manner. A source and a drain of the common transistor are connected respectively to the first common electrode and the second common electrode, and a gate of the common transistor is (Continued)

connected to the drive scan line. A source and a drain of the touch transistor are connected respectively to the data line and the second common electrode, and a gate of the touch transistor is connected to the touch scan line.

13 Claims, 6 Drawing Sheets

(52) U.S. Cl.
CPC .......... *G02F 1/1362* (2013.01); *G02F 1/1368* (2013.01); *G02F 1/136286* (2013.01); *G06F 3/0412* (2013.01); *G06F 3/0416* (2013.01); *G09G 2310/0264* (2013.01)

(56) References Cited

U.S. PATENT DOCUMENTS

| | | | |
|---|---|---|---|
| 2016/0041642 A1 | 2/2016 | Cheng et al. | |
| 2016/0282981 A1 | 9/2016 | Ding et al. | |
| 2016/0291724 A1 | 10/2016 | Li et al. | |
| 2016/0291726 A1* | 10/2016 | Li | G06F 3/0412 |
| 2016/0291777 A1* | 10/2016 | Xi | G06F 3/0416 |
| 2016/0320886 A1* | 11/2016 | Kim | G06F 3/0412 |
| 2017/0108976 A1 | 4/2017 | Ding et al. | |
| 2017/0153742 A1* | 6/2017 | Pang | G06F 3/0416 |

FOREIGN PATENT DOCUMENTS

| | | |
|---|---|---|
| CN | 104680999 A | 6/2015 |
| CN | 104699352 A | 6/2015 |
| CN | 104866141 A | 8/2015 |
| KR | 10-2012-0078100 A | 7/2012 |
| KR | 10-2014-0087431 A | 7/2014 |

OTHER PUBLICATIONS

Office Action dated Sep. 30, 2017 by the State Intellectual Property Office of People's Republic of China in corresponding Chinese Patent Application No. 201510566336.9. (6 pages).

\* cited by examiner

ARRAY SUBSTRATE AND TOUCH DISPLAY DEVICE

CROSS-REFERENCE TO RELATED APPLICATIONS

The present application claims the priority of Chinese patent application CN201510566336.9, entitled "Array substrate and touch display device" and filed on Sep. 7, 2015, the entirety of which is incorporated herein by reference.

TECHNICAL FIELD

The present disclosure relates to the technical field of display, and in particular, to an array substrate and a touch display device.

TECHNICAL BACKGROUND

With the development of display technology, liquid crystal display devices have become the most common display devices.

In the meanwhile, with the popularization of smart electronic products, capacitive touch screens are also widely used in electronic products, such as cell phones, tablet PCs, etc. Currently, capacitive touch screens mainly adopt one glass solution (OGS), on-cell, and in-cell technologies. Compared with OGS and on-cell technologies, in-cell technology is superior in production process, and products using it are thinner and lighter, more transparent, and more stable in structure.

As shown in FIG. 1, a liquid crystal display device adopting in-cell technology comprises a plurality of common electrodes 1 and a plurality of address lines 2. Each of the common electrodes 1 is connected to a drive circuit 3 with one address line 2. When an image is displayed, the common electrode 1 is connected to a common voltage output end in the drive circuit 3 through the address line 2. When a touch scan is performed, the common electrode 1 is connected to a touch signal processor in the drive circuit 3 through the address line 2.

The existing technologies have at least the following problems. In order to obtain an in-cell touch screen, it is necessary to provide an array substrate additionally with at least a third metal layer (namely address lines), and an insulating layer between the third metal layer and another conductor layer. Therefore, in the process of manufacturing the array substrate, it is required to add at least one photo engraving process (PEP), which renders the process of manufacturing the array substrate too complex.

SUMMARY OF THE INVENTION

The objective of the present disclosure is to provide an array substrate and a touch display device which are able to solve the technical problem that in the existing technologies, the process of manufacturing an array substrate is too complex.

The present disclosure provides an array substrate which comprises a pixel unit array formed by a drive scan line and a data line, and further comprises a first common electrode, a second common electrode, a touch scan line, a common transistor, and a touch transistor. The first common electrode and the second common electrode are located in a same layer, and are spaced apart from each other.

A source and a drain of the common transistor are connected respectively to the first common electrode and the second common electrode, and a gate of the common transistor is connected to the drive scan line. A source and a drain of the touch transistor are connected respectively to the data line and the second common electrode, and a gate of the touch transistor is connected to the touch scan line.

Further, each of the pixel units is provided therein with a drive transistor and a pixel electrode. A source and a drain of the drive transistor are connected respectively to the data line and the pixel electrode, and a gate of the drive transistor is connected to the drive scan line.

Preferably, the first common electrode is in a strip shape and the second common electrode is in a block shape.

Further, the first common electrode includes a transversely extending strip-shaped common electrode and a longitudinally extending strip-shaped common electrode which are connected to each other to form a grid. The second common electrode is located in the grid formed by the first common electrode.

Preferably, the first common electrode has a width ranging from 50 μm to 60 μm.

Preferably, the distance between the first common electrode and the second electrode is from 2 μm to 5 μm.

The present disclosure further provides a touch display device comprising the above array substrate.

Further, when an image is displayed, the drive scan line transmits a scan signal, and the data line transmits a grayscale signal. When a touch scan is performed, the touch scan line transmits a scan line, and the data line transmits a touch signal.

The present disclosure achieves the following beneficial effects. According to the present disclosure, the display scan and the touch scan can be performed in time-sharing manner. When an image is displayed, the drive scan line transmits the scan signal, which enables the first common electrode and the second common electrode to be connected through the common transistor and have a same electric potential, thus supplying a common voltage for display of each of the pixel units. When a touch scan is performed, the touch scan line transmits the scan signal, which enables the touch transistor to conduct. In this manner, each of the second common electrodes will be able to independently transmit the touch signal to a corresponding data line through the touch transistor and further to the drive circuit.

Therefore, in the array substrate provided by the present disclosure, the first common electrode, the second common electrode, the touch scan line, the common transistor, and the touch transistor can be used to achieve the technical effect that the display scan and the touch scan can be performed in sharing-time manner, which can render it unnecessary to provide a third metal layer, thereby simplifying the manufacturing process of the array substrate and solving the technical problem that in the existing technologies, the process of manufacturing an array substrate is too complex.

Other features and advantages of the present disclosure will be further explained in the following description, and will partly become self-evident therefrom, or be understood through the implementation of the present disclosure. The objectives and advantages of the present disclosure will be realized and achieved through the structures specifically pointed out in the description, claims, and the accompanying drawings.

BRIEF DESCRIPTION OF THE DRAWINGS

For further illustrating the technical solutions provided in the embodiments of the present disclosure, a brief introduc- FIG. 1 schematically shows a touch display device according to the existing technologies.

DETAILED DESCRIPTION OF THE EMBODIMENTS

The present disclosure will be explained in detail below with reference to the embodiments and the accompanying drawings, so that one can fully understand how the present disclosure solves the technical problem and achieves the technical effects through the technical means, thereby implementing the same. It should be noted that as long as there is no structural conflict, any of the embodiments and any of the technical features thereof may be combined with one another, and the technical solutions obtained therefrom all fall within the scope of the present disclosure.

The present embodiment provides a touch display device which can be used in electronic products such as mobile phones, tablet PCs, etc. The touch display device comprises an array substrate, a drive circuit, etc.

Figure 1:
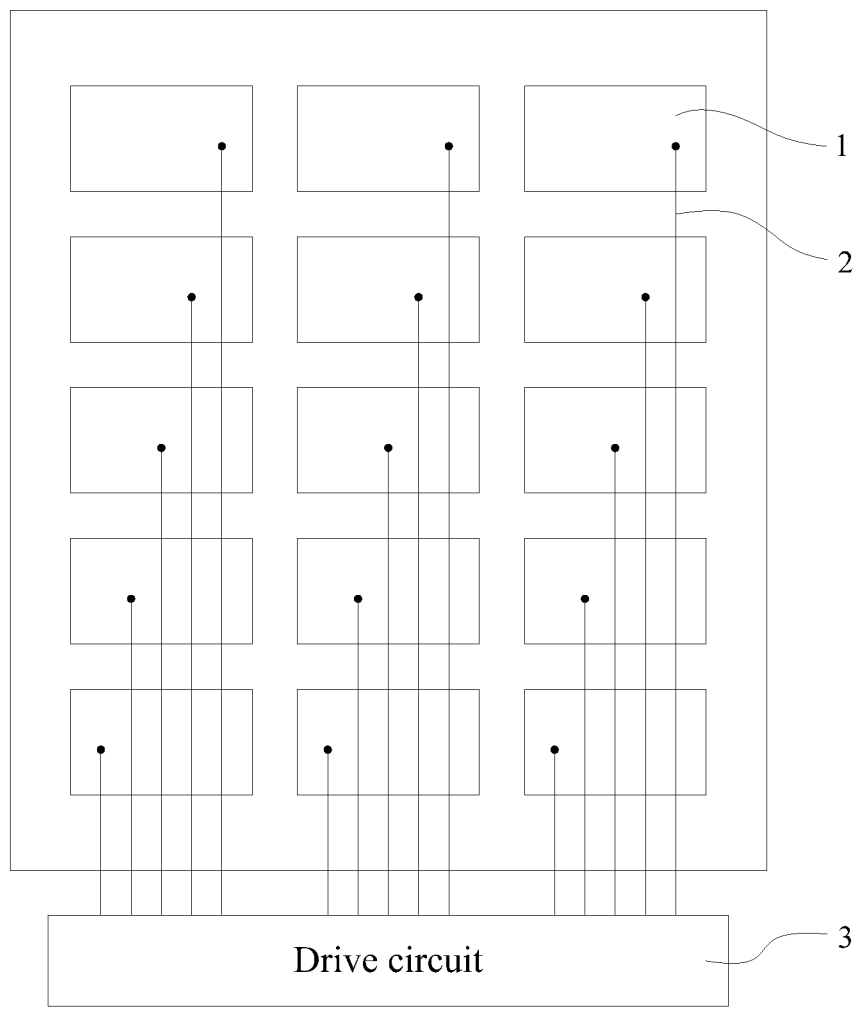
Figure 2:
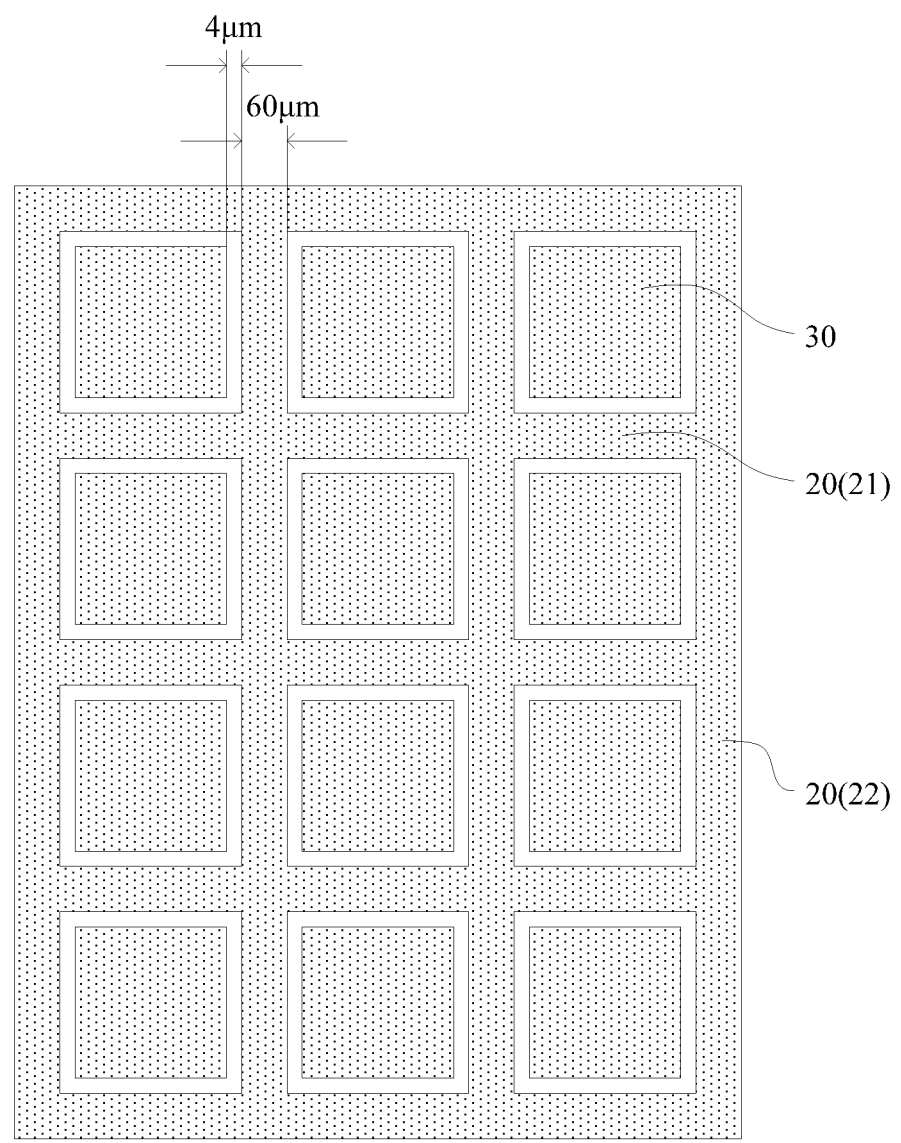
FIG. 2 schematically shows an array substrate according to the embodiments of the present disclosure.
Figure 3:
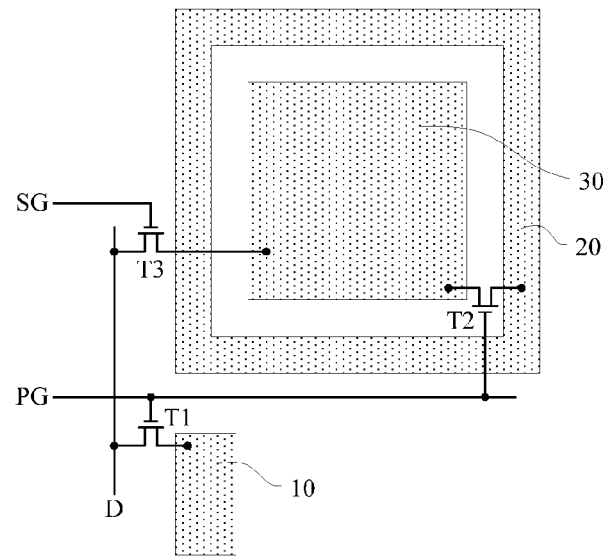
FIG. 3 schematically shows a part of the array substrate according to the embodiments of the present disclosure.

As shown in FIGS. 2 and 3, the array substrate comprises a pixel unit array formed by a drive scan line PG and a data line D. Each of the pixel units is provided therein with a drive transistor T1 and a pixel electrode 10. A source and a drain of the drive transistor T1 are connected respectively to the data line D and the pixel electrode 10, and a gate of the drive transistor T1 is connected to the drive scan line PG.

In the present embodiment, the array substrate further comprises a first common electrode 20, a second common electrode 30, a touch scan line SG a common transistor T2, and a touch transistor T3. The first common electrode 20 is in a strip shape and the second common electrode 30 is in a block shape. The first common electrode 20 and the second common electrode 30 are located in a same layer, and are spaced apart from each other.

In the process of manufacturing the array substrate, the first common electrode 20 and the second common electrode 30 can be formed in a same photo engraving process (PEP) because they are located at a same layer. Thus, the number of the PEPs can be decreased and the manufacturing process of the array substrate can be simplified.

As a preferred technical solution, the first common electrode 20 includes a transversely extending strip-shaped common electrode 21 and a longitudinally extending strip-shaped common electrode 22 which are connected to each other to form a grid. The second common electrode 30 is located in the grid formed by the first common electrode. Preferably, the first common electrode 20 has a width ranging from 50 µm to 60 µm, and in the present embodiment, said width is 60 µm. Preferably, a distance between the first common electrode 20 and the second common electrode 30 is from 2 µm to 5 µm, and in the present embodiment, said distance is 4 µm.

As shown in FIG. 3, the source and the drain of the common transistor T2 are connected respectively to the first common electrode 20 and the second common electrode 30, and the gate of the common transistor T2 is connected to the drive scan line PG. The source and the drain of the touch transistor T3 are connected respectively to the data line D and the second common electrode 30, and the gate of the touch transistor T3 is connected to the touch scan line SG.

Figure 4:
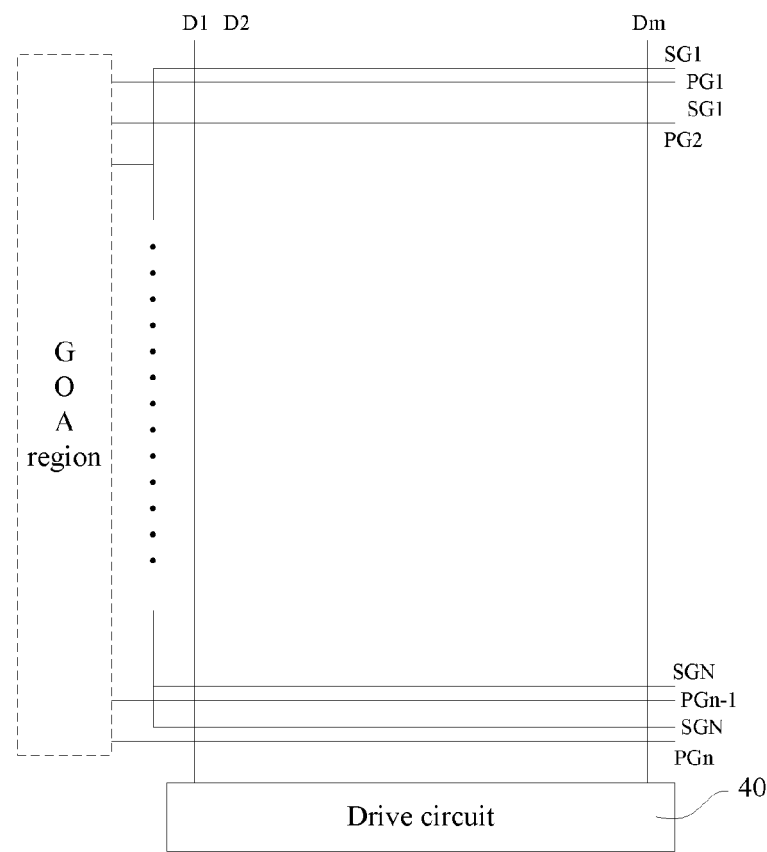
FIG. 4 schematically shows a touch display device according to the embodiments of the present disclosure.

As shown in FIG. 4, in the present embodiment, the gate driver on array (GOA) technology is adopted. That is, the array substrate is a GOA array substrate, and the drive scan lines PG1-PGn and the touch scan lines SG1-SGn all come out of the GOA region. By providing a gate drive circuit on the array substrate by means of the GOA technology, progressive scan of scan lines can be achieved. Therefore, the gate drive circuit can be formed on the periphery of the array substrate by using conventional manufacturing process of the array substrate to replace a conventional external drive chip. It can thus be seen that the GOA technology is able to render procedure of bonding the drive chip unnecessary, thus improving production efficiency and decreasing product cost, and in the meantime, reducing the width of the bezel of the touch display device.

As a preferred technical solution, the touch scan lines each are divided into several branches after coming out of the GOA region. Because the area of the second common electrode is large, it is necessary to use a plurality of touch transistors to charge one second common electrode at the same time so that the second common electrode can reach a predetermined electric potential. For example, branches of the touch scan line SG1 all correspond to a same second common electrode and each of the branches is respectively connected to a gate of one of the touch transistors. When the touch scan line SG1 outputs a high-level voltage, each of the branches is able to enable a touch transistor to conduct. In this manner, the data lines will be able to charge one of the second common electrodes through these touch transistors.

As shown in FIG. 4, the touch display device provided by the present embodiment further comprises a drive circuit 40. Each of the data lines D1-Dm comes out of the drive circuit 40. When an image is displayed, the drive circuit 40 outputs a gray-scale signal to each of the data lines. When a touch scan is performed, the drive circuit 40 outputs a reference signal to each of the data lines and receives a touch signal through the data lines.

Figure 5:
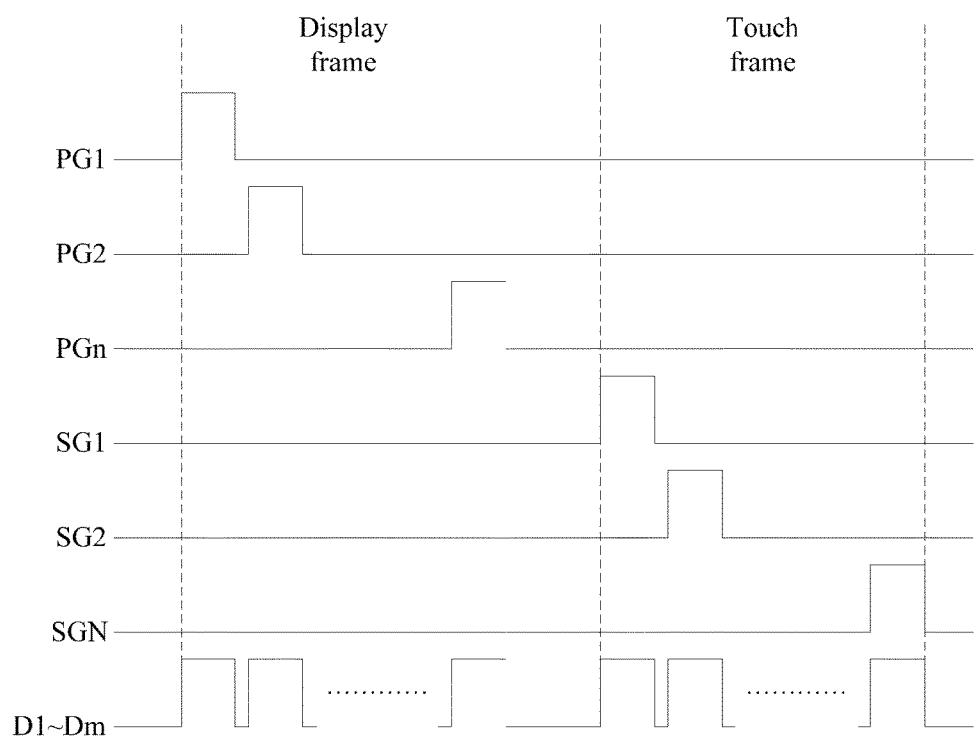
FIG. 5 shows a diagram of a time sequence of signals of the touch display device according to the embodiments of the present disclosure.

The touch display device provided by the present embodiment has a refresh rate of over 60 Hz. As shown in FIG. 5, in the present embodiment, the refresh rate is 60 Hz, and the time for refreshing each frame, including display frame and touch frame, is 16.67 ms. Specific operations are as follows.

When an image is displayed (display frame), the drive scan line PG transmits the scan signal line by line, and the drive transistor T1 and the common transistor T2 are caused to conduct. The first common electrode 20 and the second common electrode 30 can be caused to conduct by the common transistor T2, and consequently to have a same electric potential, namely a same common voltage, thus supplying the common voltage for display of each of the pixel units. Meanwhile, the drive circuit 40 is configured to output the gray-scale signal to the data line D which then inputs the gray-scale signal to the pixel electrode 10 of the pixel unit through the drive transistor T1, so that the pixel electrode 10 can have a certain gray-scale voltage. In this case, a potential difference will be present between the pixel electrode 10 and the second common electrode 30 (or the first common electrode 20), thus forming an electric field which enables liquid crystal molecules to deflect, thereby achieving the display of images.

When a touch scan (touch frame) is performed, the touch scan line SG transmits the scan signal line by line, and the touch transistor T3 begins to conduct. The reference signal output by the drive circuit 40 to the data line D can be transmitted to the second common electrode 30 through the touch transistor T3. The second common electrodes 30 each are independent from one another. When a touch operation by a user enables a certain one of the second common electrodes 30 to generate a touch signal, said touch signal can be transmitted to the drive circuit 40 through the touch transistor T3 and the data line D, thus achieving the collecting and processing of the touch signal.

Therefore, in the touch display device and the array substrate provided by the present disclosure, the first common electrode, the second common electrode, the touch scan line, the common transistor, and the touch transistor can be used to achieve the technical effect that the display scan and the touch scan can be performed in sharing-time manner, which can render it unnecessary to provide a third metal layer, thereby simplifying the manufacturing process of the array substrate and solving the technical problem that in the existing technologies, the process of manufacturing an array substrate is too complex, and reduces the cost of manufacturing a touch display device.

Besides, in the existing technologies, each of the common electrodes is connected to the drive circuit through an address line. However, in the present embodiment, addressing is performed by means of the data lines, and it is therefore not necessary to provide additional address lines, thereby distinctly decreasing the number of signal channels of the drive circuit, and further reducing the cost of manufacturing an array substrate.

Figure 6:
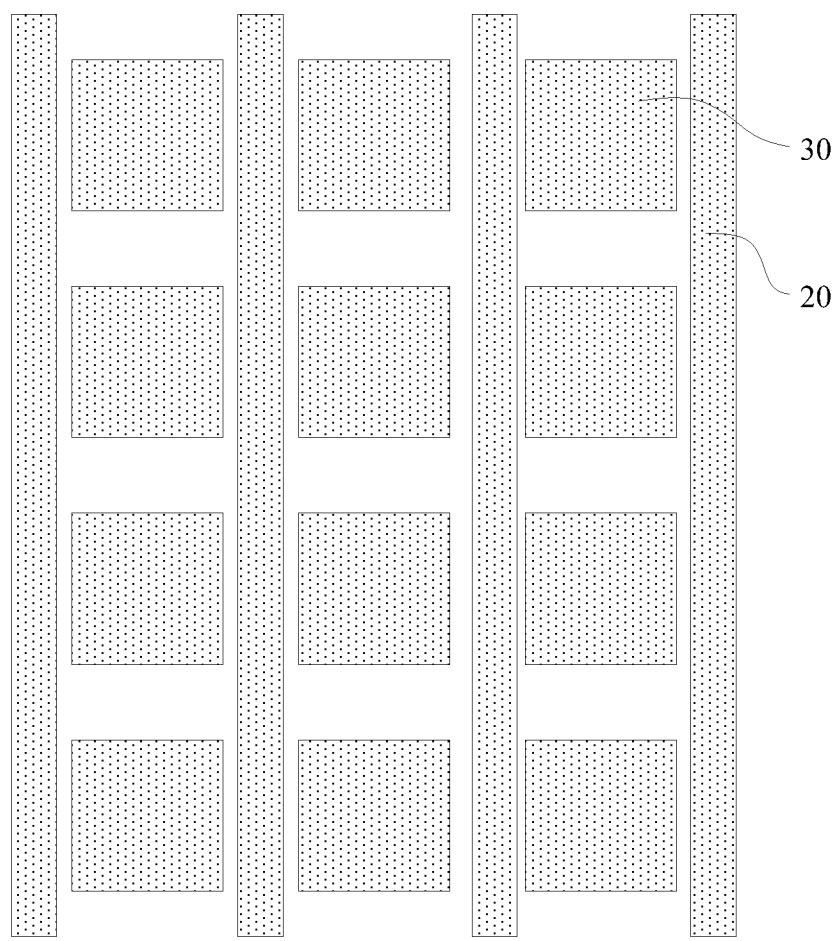
FIGS. 6 and 7 each schematically show an array substrate according to other embodiments of the present disclosure.
Figure 7:
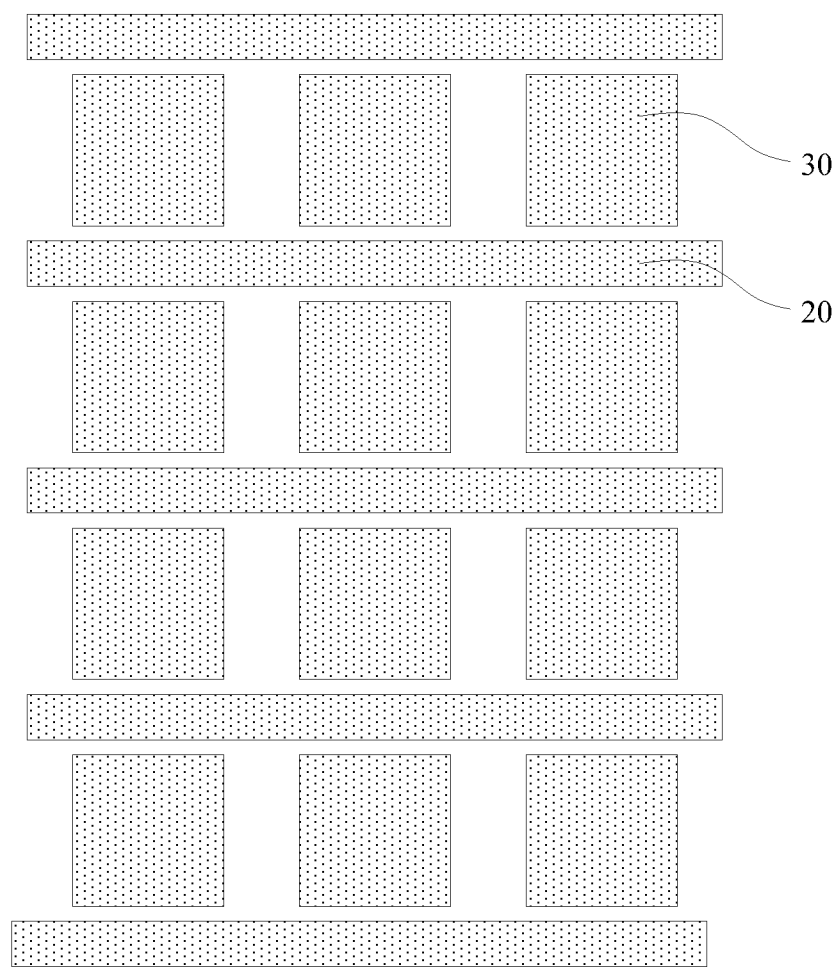

It should be noted that in other embodiments of the present disclosure, the first common electrodes can extend only in a single direction. For example, as shown in FIG. 6, the strip-shaped first common electrodes 20 can extend only in the longitudinal direction, and the block-shaped second common electrodes are disposed between the first common electrodes 20. Alternatively, as shown in FIG. 7, the strip-shaped first common electrodes 20 can extend only in the transverse direction, and the block-shaped second common electrodes are disposed between the first common electrodes 20.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. An array substrate, comprising a pixel unit array formed by a drive scan line and a data line, and further comprising a first common electrode, a second common electrode, a touch scan line, a common transistor, and a touch transistor,
   wherein the first common electrode and the second common electrode are located in a same layer, and are spaced apart from each other,
   a source and a drain of the common transistor are connected respectively to the first common electrode and the second common electrode, and a gate of the common transistor is connected to the drive scan line, and
   a source and a drain of the touch transistor are connected respectively to the data line and the second common electrode, and a gate of the touch transistor is connected to the touch scan line.

2. The array substrate according to claim 1, wherein each of the pixel units is provided therein with a drive transistor and a pixel electrode, a source and a drain of the drive transistor being connected respectively to the data line and the pixel electrode, and a gate of the drive transistor being connected to the drive scan line.

3. The array substrate according to claim 1, wherein the first common electrode is in a strip shape and the second common electrode is in a block shape.

4. The array substrate according to claim 3, wherein the first common electrode includes a transversely extending strip-shaped common electrode and a longitudinally extending strip-shaped common electrode which are connected to each other to form a grid, and
   the second common electrode is located in the grid formed by the first common electrode.

5. The array substrate according to claim 3, wherein the first common electrode has a width ranging from 50 μm to 60 μm.

6. The array substrate according to claim 3, wherein a distance between the first common electrode and the second electrode is from 2 μm to 5 μm.

7. A touch display device, comprising an array substrate, wherein the array substrate comprises a pixel unit array formed by a drive scan line and a data line, and further comprises a first common electrode, a second common electrode, a touch scan line, a common transistor, and a touch transistor,
   wherein the first common electrode and the second common electrode are located in a same layer, and are spaced apart from each other,
   a source and a drain of the common transistor are connected respectively to the first common electrode and the second common electrode, and a gate of the common transistor is connected to the drive scan line, and
   a source and a drain of the touch transistor are connected respectively to the data line and the second common electrode, and a gate of the touch transistor is connected to the touch scan line.

8. The touch display device according to claim 7, wherein each of the pixel units is provided therein with a drive transistor and a pixel electrode,
   a source and a drain of the drive transistor being connected respectively to the data line and the pixel electrode, and a gate of the drive transistor being connected to the drive scan line.

9. The touch display device according to claim 7, wherein the first common electrode is in a strip shape and the second common electrode is in a block shape.

10. The touch display device according to claim 9, wherein the first common electrode includes a transversely extending strip-shaped common electrode and a longitudinally extending strip-shaped common electrode which are connected to each other to form a grid, and
   the second common electrode is located in the grid formed by the first common electrode.

11. The touch display device according to claim 9, wherein the first common electrode has a width ranging from 50 μm to 60 μm.

12. The touch display device according to claim 9, wherein a distance between the first common electrode and the second electrode is from 2 μm to 5 μm.

13. The touch display device according to claim 7, wherein when an image is displayed, the drive scan line transmits a scan signal, and the data line transmits a gray-scale signal, and when a touch scan is performed, the touch scan line transmits a scan line, and the data line transmits a touch signal.

\* \* \* \* \*